Figure 1:
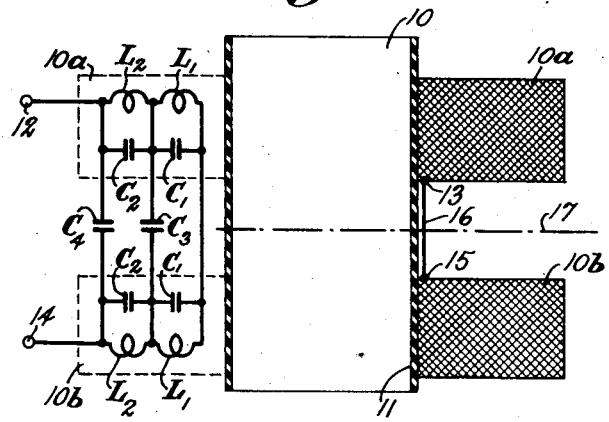

Sept. 7, 1937.　　　　　H. A. WHEELER　　　　　2,092,708
RADIO FREQUENCY INDUCTANCE UNIT
Filed March 29, 1935　　3 Sheets-Sheet 1

INVENTOR
HAROLD A. WHEELER
BY
ATTORNEY

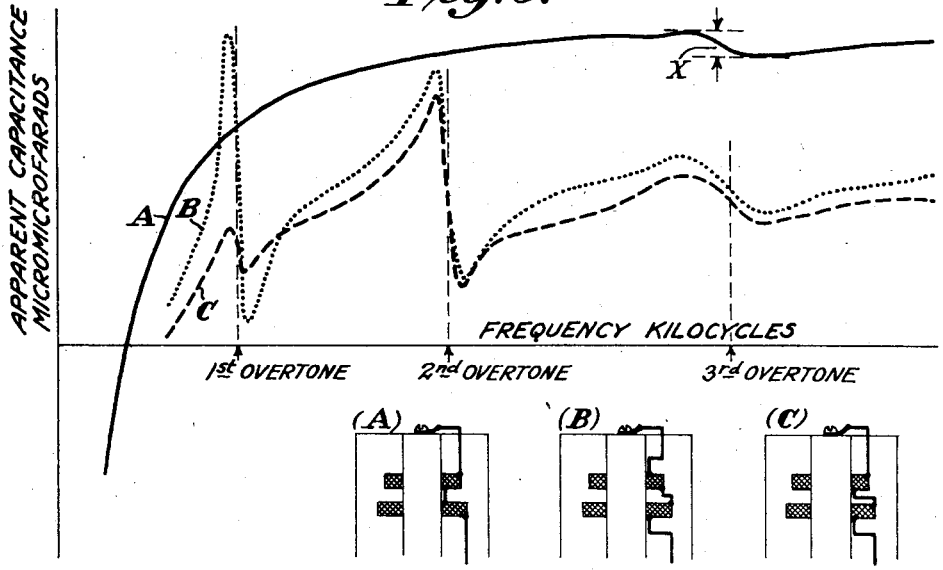
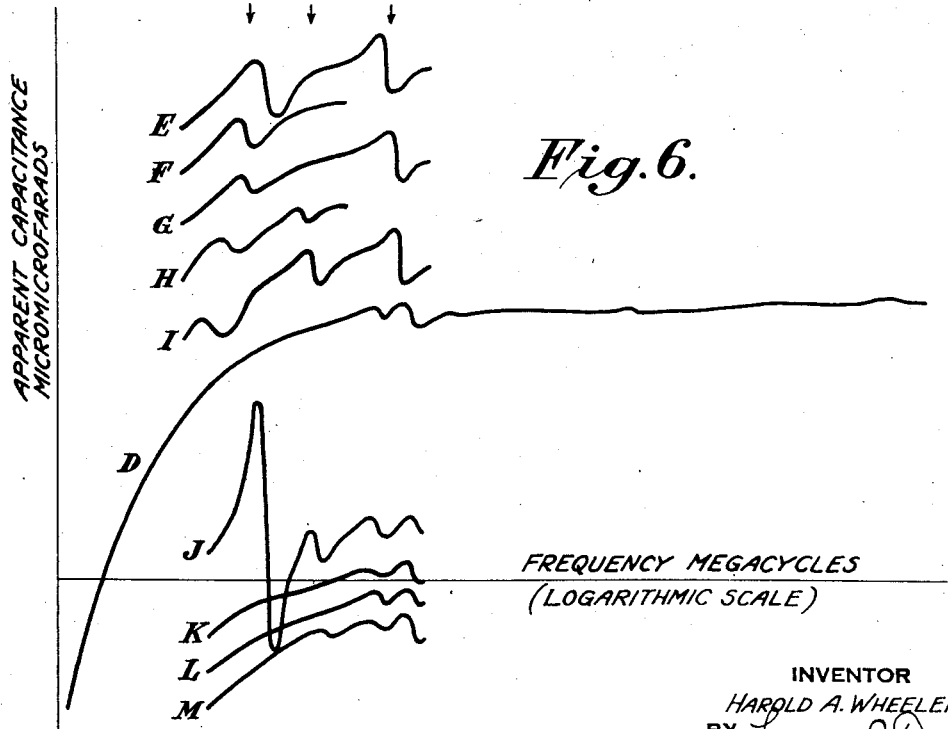

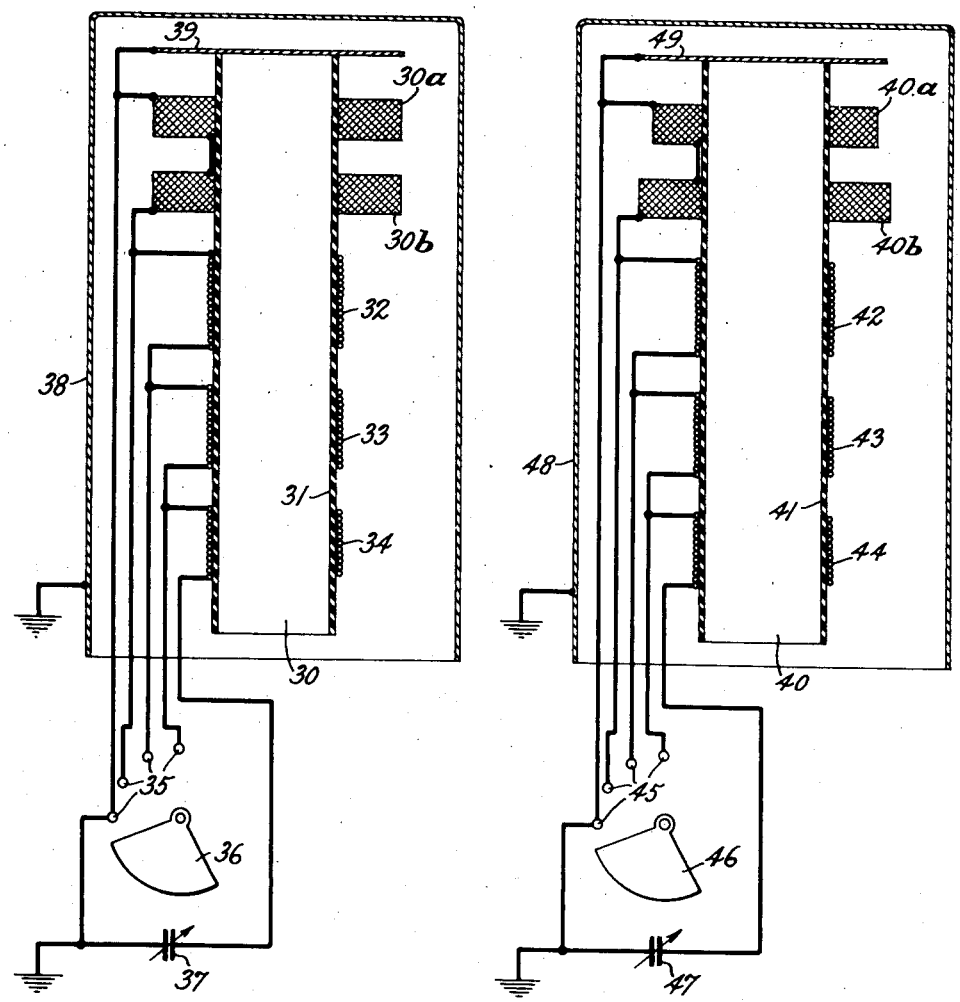

Patented Sept. 7, 1937

2,092,708

UNITED STATES PATENT OFFICE 2,092,708

RADIO-FREQUENCY INDUCTANCE UNIT

Harold A. Wheeler, Great Neck, N. Y., assignor to Hazeltine Corporation, a corporation of Delaware Application March 29, 1935, Serial No. 13,750

REISSUED

24 Claims. (Cl. 250—40)

My invention relates to radio-frequency self-inductance units and, while my invention is of general application, it is particularly suitable for application to units of the type known in the art as choke coils.

The behavior of radio-frequency self-inductance units is complicated by the irregularity or non-uniformity of the distributed capacitance and inductance of such units when wound or fabricated in a conventional manner. These irregularities in distributed inductance and capacitance are due to a number of factors, among which may be mentioned the variation in the dimensions of the turns of different portions of the unit. In case the inductance unit is shielded or otherwise related to a conductive reference body of fixed relative potential, there arises also the disturbing effect of non-uniform distributed capacitance to the reference body. The effect of these irregularities in distributed inductance and capacitance is evidenced by the presence of parasitic or local oscillatory currents in portions of the inductance unit. Such parasitic currents may be identified by irregularities or discontinuities in the curve of apparent capacitance versus frequency of the inductance unit and by corresponding sharp peaks in the curve of the apparent shunt conductance versus frequency. Since the apparent capacitance is easily measured, as by means of a susceptance-indicating meter or bridge, the irregularities in the capacitance-frequency curve are easily employed to identify the frequencies of the local parasitic currents.

As stated above, the principal effect of these local parasitic currents is to increase the apparent shunt conductance of the unit, while it is highly desirable that such inductance unit behave simply as a parallel inductance and capacitance with a minimum of shunt conductance. Some apparent shunt conductance is unavoidable, due to the dissipation in the inductance unit, but excess apparent shunt conductance, due to local parasitic currents, is objectionable and may be much greater than the unavoidable minimum. The excess shunt conductance is most detrimental when the inductance unit is connected across a sharply tuned circuit whose own apparent shunt conductance is small. In small multi-layer coils suitable for use at broadcast frequencies, the excess apparent shunt conductance, due to such parasitic currents, may be of the order of magnitude of 30 micromhos as compared with values of from 5 to 15 micromhos for tuned circuits of this type.

While it is not possible to eliminate the local parasitic or oscillatory currents of all frequencies, corresponding to a perfectly distributed inductance and capacitance, it is usually the case that the effects described above arise only from the overtones; that is, oscillatory currents having frequencies which are approximate, though not exact, even multiples of the fundamental resonant frequency of the inductance units. Furthermore, it is usually only the first two or three overtones which are particularly troublesome and need be considered, since the dissipation at the higher frequencies in the inductance of the unit limits the magnitude of these currents to a negligible value.

One specific instance in which the above-described phenomena are troublesome is the case of multiple frequency-range coils, such, for example, as may be utilized in coupling systems or tuning systems of a multiple-band radio receiver. In this type of apparatus it is customary to short-circuit the lower frequency higher inductance units when operating in the higher frequency ranges. In such a case, the overtone frequencies of the short-circuited coils may lie within the higher frequency operating range and effect a serious damping of the active coil, due to the coupling between these coils occasioned by the inductance of the leads to the coils or due to any other stray coupling.

It is an object of my invention to provide a new and improved radio-frequency self-inductance unit which will overcome the above-mentioned disadvantages of the arrangements of the prior art and which will be substantially the equivalent of a single lumped inductance and capacitance in parallel.

It is another object of my invention to provide a new and improved radio-frequency self-inductance unit in which an increase in apparent shunt conductance, due to parasitic or oscillatory currents flowing in portions of the unit, is substantially eliminated.

It is another object of my invention to provide a new and improved radio-frequency self-inductance unit in which the unit is divided into sections spaced and proportioned so that the distributed capacitance therebetween, or between the sections and a conductive reference body of fixed relative potential, such as a shield, compensates for the non-uniformity of distributed inductance and capacitance of each section, and substantially suppresses the disturbing overtones.

In accordance with my invention, a radio-frequency self-inductance unit may comprise a plurality of serially connected coaxial concentrated winding sections each of which tends to have a non-uniform distributed inductance and capacitance. The spacing of the sections of the unit is so determined as to provide a distributed capacitance between the sections effective substantially to compensate for the non-uniformity of the distributed capacitance and inductance of each section, such spacing being effective primarily in suppressing the second overtone. The sections of such an inductance unit are preferably wound in such a direction that their mutual inductance adds to the self-inductance of the unit, and the spacing between them is preferably not so great as to reduce the mutual inductance to an insubstantial value and may be something less than their maximum radius. The series connection between the two sections is preferably made between the inner terminals of the sections. The foregoing conditions of design of an inductance unit are sufficient to secure the beneficial results of my invention when applied to a symmetrical unit; that is, one in which the sections of the unit are dimensionally and electrically symmetrical with respect to each other and to a conductive reference body of fixed potential, such as a shield, the symmetry of the unit being effective primarily in suppressing the first overtone. A well-known application of such a unit is in a push-pull radio-frequency translating circuit.

In case the sections of the inductance unit are unsymmetrically disposed relative to a conductive reference body, an additional disturbing factor is encountered due to the non-uniform distributed capacitance of the sections relative to such body. In accordance with my invention, this disturbing factor is substantially eliminated by connecting a terminal of one of said sections to said reference body and reducing its inductance, as by diminishing its number of turns, relative to that of the other section, this proportioning of the inductance of the sections of an unsymmetrical inductance unit being effective primarily in suppressing the first overtone.

My invention is particularly applicable to multiple frequency-range inductance units for use in tuning or coupling the circuits of multiple band radio receivers. When so utilized, the inductance unit may be designed as described above and constitutes the low frequency coil of such multiple frequency unit. The inductance unit may be mounted coaxially with a plurality of distributed winding sections having lower inductances. A conductive shielding receptacle may surround the whole assembly and is usually unsymmetrically disposed relative to the sections of the low-frequency coil. Preferably, an auxiliary shielding disc is interposed between the shielding receptacle and the section having the larger distributed capacitance thereto, which section may also have the smaller inductance, to minimize the capacitive currents from the center of this coil section to ground.

For a better understanding of my invention, together with other objects and features thereof, reference is had to the following description taken in connection with the accompanying drawings, and its scope will be pointed out in the appended claims.

Figure 2:
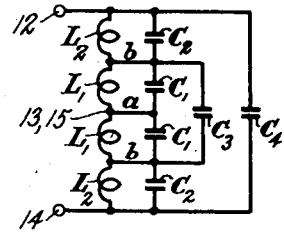
Figure 3:
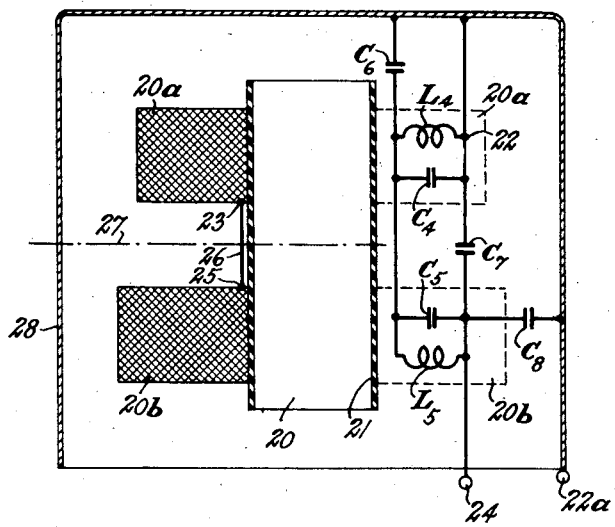
Figure 4:
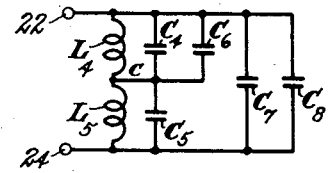

Referring now to the drawings, Fig. 1 represents a symmetrical radio-frequency self-inductance unit embodying my invention, shown partly in section and partly schematically; Fig. 2 is a rearranged schematic diagram of the unit of Fig. 1 to aid in the understanding of my invention; Fig. 3 is a view, similar to Fig. 1, of an unsymmetrical shielded self-inductance unit embodying my invention; Fig. 4 is a rearranged schematic circuit diagram of the unit of Fig. 3; Figs. 5 and 6 comprise a series of curves representing certain operating characteristics of the inductance unit of Fig. 3 with different types of connections and different spacings between sections; while Figs. 7 and 8 represent the application of my invention to a multiple frequency-band inductance unit.

Referring now to Fig. 1 of the drawings, there is shown an inductance unit 10, embodying my invention, partly in section and partly by means of a schematic diagram. The unit 10 comprises two coaxial concentrated winding sections 10a and 10b having outer terminals 12 and 14 and inner terminals 13 and 15, respectively. By the terms "inner" and "outer" terminals are meant, respectively, terminals connected to the innermost and outermost layers of winding sections, in case they are layer wound, or to the innermost and outermost turns of the sections, in case they are wound in any other manner. The inner terminals 13 and 15 are interconnected by a conductor 16 so that the coil sections 10a and 10b are effectively in series. The winding sections 10a and 10b are preferably mounted on a form or cylinder 11 of insulation material and are symmetrically disposed with respect to a center or reference plane, indicated by the trace 17. The coils are wound in opposite directions such that the mutual inductance therebetween aids the self-inductance of the unit and, as stated above, their spacing is less than their maximum radius to provide a substantial mutual inductance.

For the purpose of analysis, each of the winding sections 10a and 10b may be considered as broken up into two parts, an outer part and an inner part, respectively. This arrangement is shown in the left-hand portion of Fig. 1, in which the outer and inner parts are represented by the inductances $L_2$ and the shunt distributed capacitances $C_2$, and by the inductances $L_1$ and associated distributed capacitances $C_1$, respectively. There also exists a distributed capacitance $C_3$ between the intermediate portions of the two winding sections and a distributed capacitance $C_4$ between the outermost portions of the winding sections. While the winding sections 10a and 10b might be further subdivided into a plurality of component elements or increments, such further subdivision is unnecessary to demonstrate the principles involved in designing an inductance unit in accordance with my invention.

The schematic diagram of Fig. 1 has been redrawn in Fig. 2 to aid in understanding the principles involved. Referring to this latter figure, it is necessary, in order to avoid any parasitic or local oscillatory currents, that the inductance unit should have the characteristics of simple lumped inductance and capacitance in parallel. When such a relationship exists, no currents will flow in the conductors $a$ or $b$ of Fig. 2. Symmetry of the unit tends to balance out any current in the conductor $a$ and such symmetry, therefore, constitutes what may be termed the first condition for the design of an inductance unit in accordance with my invention. In other words, the symmetry of the unit is effective in substantially suppressing the first overtone.

In order that there shall be no current flowing in the conductors $b$, the natural resonant frequency of the circuit $L_1$, $L_1$, $C_1$, $C_1$, $C_3$ must be the same as that of either of the circuits $L_2$, $C_2$. Stated in another way; if the natural resonant frequency of either of the circuits $L_2$, $C_2$ is different from that of the circuit $L_1$, $L_1$, $C_1$, $C_1$, $C_3$ there will be a frequency between these two natural frequencies, at which the reactance of the two circuits $L_2$, $C_2$ is equal and opposite to that of the circuit $L_1$, $L_1$, $C_1$, $C_1$, $C_3$ and, since all three circuits are effectively in series between the main terminals 12, 14 of the inductance unit, they constitute in effect a short circuit for currents of this frequency. From the above considerations, it is evident that no current will flow in conductors $b$ if the spacing between the winding sections, which determines the capacitance $C_3$, is such that the following relation is satisfied:

$$L_1(C_1+2C_3) = L_2C_2 \tag{1}$$

If the winding sections 10a and 10b are connected through their inner terminals, as shown, $L_1$, $C_1$ is ordinarily less than $L_2$, $C_2$ so that there is no difficulty in securing this relationship. It is to be noted that the capacitance $C_4$ is effectively connected directly between the terminals 12 and 14 and does not affect the distribution of inductance and capacitance over the unit. The spacing of the sections of an inductance unit in accordance with equation (1) is effective substantially to suppress the second overtone.

While the mutual inductance between the winding sections has been neglected in the above analysis, the same principles will be found to apply in the presence of mutual inductance. Such symmetrical inductance units are particularly applicable for use in circuits symmetrically disposed with respect to a conductive body of fixed reference potential, such as a shielding device or a ground, as, for example, in balanced or push-pull translation circuits.

An inductance unit designed as above described will be substantially free from parasitic or local oscillatory currents; will have a minimum excess shunt conductance and a minimum variation of apparent capacitance, that is, its apparent-capacitance-frequency curve will be substantially smooth and continuous.

Figs. 3 and 4 represent corresponding diagrams of an unsymmetrical inductance unit. In the case of such a unit the first condition described above, that is, symmetry, must be modified, while the second condition, that is, the relationship between the natural resonant frequencies of the several component increments of the unit, applies in principle. In this figure the unsymmetrical inductance unit 20 comprises winding sections 20a and 20b coaxially disposed on a form or cylinder 21 of insulation material and having outer terminals 22 and 24 and inner terminals 23 and 25, respectively. The sections 20a and 20b are serially connected through their inner terminals by conductor 26, as in the arrangement of Fig. 1. It will be noted in this case, however, that the winding sections 20a and 20b and shield receptacle 28 surrounding the winding sections are both dimensionally and electrically unsymmetrical with respect to the center plane represented by the trace 27, the electrical dissymmetry being partially caused by the effective connection of the shield 28 to an outer terminal of one of the winding sections. When the shield 28 has a portion, such as the closed end portion thereof, to which one of the winding sections, for example 20a, is in closer proximity, it is preferred to connect the outer terminal 22 of such winding directly to the shield 28, which is provided with an auxiliary terminal 22a. As in the case of the device of Fig. 1, the two winding sections are wound oppositely so that their mutual inductance aids the self-inductance of the unit.

In Figs. 3 and 4, the individual winding sections are not illustrated as subdivided, as in Fig. 1, since the same principles apply thereto. The winding sections 20a and 20b are represented by the inductances $L_4$ and $L_5$ and associated distributed capacitances $C_4$ and $C_5$, respectively. The effective distributed capacitance between the outer portions of the winding sections $L_4$ and $L_5$ is represented by the capacitance $C_7$. The effective capacitance between the inner portions of sections $L_4$ and $L_5$ and the shield 28 is represented by the capacitance $C_6$. The capacitance between the outer portion of section $L_5$ and the shield 28 is represented by the capacitance $C_8$. In the diagram of Fig. 4, in order that no parasitic or local oscillatory currents shall flow, it is necessary that no current shall flow in the conductor $c$. This current is balanced out if the resonant frequency of the circuit $L_4$, $C_4$, $C_6$ is the same as that of the circuit $L_5$, $C_5$. The capacitances $C_7$ and $C_8$ are effectively connected directly between the main terminals 22 and 24 and do not affect the distribution of inductance and capacitance over the unit. In such arrangement, if the winding sections 20a and 20b had an equal number of turns, their inductances $L_4$ and $L_5$ and distributed capacitances $C_4$ and $C_5$ would be equal, and it would be impossible to satisfy the last recited condition. However, by reducing the number of turns in the winding section $L_4$, the resonant circuit $L_4$, $C_4$, $C_6$ can be made to have the same natural frequency as the circuit $L_5$, $C_5$. This condition obtains when the following relation is satisfied:

$$L_4(C_4+C_6) = L_5C_5 \tag{2}$$

This relation can be easily obtained by reducing the number of turns of the winding section 20a, as indicated in Fig. 3. Failure to satisfy the condition just described results in the circuit $L_4$, $C_4$, $C_6$ being resonant at a frequency different from the circuit $L_5$, $C_5$, so that these two circuits have equal and opposite reactance at some intermediate frequency and, being effectively in series between the terminals 22 and 24, tend to provide a short-circuit for currents of this frequency. By designing an unsymmetrical inductance unit in accordance with equation (2) the first overtone may be substantially suppressed. While the mutual inductance between the winding sections has been neglected in the above analysis, the same principles will be found to apply in the presence of mutual inductance.

In Fig. 5 are represented certain operating characteristics of a 30 millihenry inductance unit designed in accordance with the foregoing principles. Curve A represents the relation between apparent capacitance and frequency of the coil shown schematically at (A) of Fig. 5, in which the number of turns of the winding sections have been proportioned in accordance with equation (2) above, and with their innermost terminals connected. This coil had a natural frequency of 420 kilocycles and behaved substantially as 30 millihenries and 4.8 micromicrofarads in parallel. Curve B represents the corresponding characteristic of such a coil with the interconnection between the outer terminals of the two winding sections rather than the inner terminals, as shown schematically at Fig. 5 (B). Curve B has a very considerable irregularity in the neighborhood of the first, second and third overtones. The presence of these disturbing irregularities is probably due to the change in the relationship between the capacitances between component increments of the inductance unit and the distributed capacitances of these increments, from those indicated schematically in Figs. 1–4. Again, the same characteristic is shown for the same coil in curve C, in which the inner terminal of the smaller coil is connected to the outer terminal of the larger, as indicated at (C), Fig. 5. These same disturbing effects are present to nearly the same degree as in curve B.

The higher overtones of an inductance unit of the type described above may be only incompletely suppressed, due to the variations of inductance and distributed capacitance in the unit and of the distributed capacitance between component sections. A perfect compensation is based upon the assumption that the inductance and capacitance of a unit may be considered as lumped in a certain number of subdivided elements or increments while, in reality, there is an infinite number of such increments which would have to be considered to obtain a complete suppression of all the higher overtones. However, as indicated by curve A of Fig. 5, the first and second overtones are substantially completely eliminated by the approximate compensation described above, while the third overtone is reduced so that it is not of disturbing magnitude.

The reduction of the third overtone is largely due to the fact that the third overtone frequencies are slightly different in the two sections of the coil, and partly compensate each other.

Curve D of Fig. 6 represents a similar operating characteristic of a 90 millihenry inductance unit of the type shown in Fig. 3 and designed in accordance with my invention. In this figure are shown a series of vertically displaced partial curves depicting the effect on the shape of the curve of varying the separation between the sections. The upper group of displaced curves E, F, G, H, and I represent the characteristics of two symmetrical sections for separations between the sections of $\frac{1}{16}$, $\frac{3}{32}$, $\frac{1}{8}$, $\frac{3}{16}$ and $\frac{1}{4}$ inches, respectively. This group of curves indicates that curve G, corresponding to $\frac{1}{8}$ inch separation, was most effective in suppressing the second overtone while at the same time minimizing the first overtone. The lower group of displaced curves J, K, L, M represent the same characteristics for spacings of $\frac{1}{32}$, $\frac{1}{16}$, $\frac{1}{8}$, and $\frac{1}{4}$ inches, respectively, after changing the relative number of turns of the two winding sections of the inductance unit, as in the device of Fig. 3, to satisfy equation (2). This lower group of curves indicates that the $\frac{1}{8}$ inch separation (curve L) is still optimum. They also show the advantage of unequal frequencies of the third overtone in the two coil sections, reducing the total effect of the third overtone. In curve D of Fig. 6, it is noted that the first and second overtones are substantially eliminated by designing the inductance unit in accordance with the principles described. The third overtone is still present to a slight degree, but it is of less importance, particularly in small inductance units, since the dissipation in the windings at the higher frequencies minimizes the effect of the higher overtones.

The magnitude of the disturbing effect of any particular overtone can be evaluated in terms of $x$, the difference between the maxima and minima of the irregularity, as indicated, for example, in curve A of Fig. 5. When such an inductance unit is connected across a circuit, the capacitance of which is C, the resulting excess power factor appearing in the tuned circuit is $x/C$. For example, in the unit the characteristic of which is represented by this latter curve, at 2300 kilocycles, where $x=0.35$ micromicrofarad, the excess shunt conductance is only 5 micromhos and the excess power factor is 0.35 percent, when connected across a tuned circuit of $C=100$ micromicro-farads.

In the characteristic curves A and D of Figs. 5 and 6, respectively, it is noted that, while the first and second overtones are substantially eliminated, the third overtone is still present to an appreciable degree. There seems to be considerable difficulty in completely eliminating this third overtone, although it will not be of disturbing magnitude in ordinary instances, as described above. Furthermore, it is generally possible to locate the third overtone at such a frequency that its detrimental effect is minimized. This can be accomplished by proportioning the inductance unit so that the disturbing overtone falls either completely outside of the operating or tuning range of the circuit across which the inductance unit is connected, or within, and adjacent that limit of, the tuning range in which the tuning condenser has a capacitance of the order of its maximum value so that the ratio of the differential capacitance, due to the presence of the disturbing overtone, to the total capacitance of the circuit is a minimum. On the other hand, in case the inductance unit is only indirectly coupled to the active circuit, it should be proportioned so that the disturbing overtone lies outside the tuning range or within, and adjacent that limit of, the tuning range in which the tuning condenser has a minimum capacitance, since in this case there is introduced effectively in series with the tunable circuit a maximum series resistance at the overtone frequency.

While it is to be understood that the curves of Figs. 5 and 6 represent typical characteristics of radio-frequency inductance units constructed in accordance with my invention, there follows the specifications of the particular units from which the curves of Figs. 5 and 6 were obtained. The sections of the unit of Fig. 5 had 750 and 1000 turns, respectively; an inner diameter of $\frac{1}{2}''$, and an axial length of $\frac{3}{16}''$; and were formed of #38 SSE wire multi-layer wound, gears 38/39, and impregnated with Cerese AA. The sections of the unit of Fig. 6 were of 1200 and 1500 turns, respectively, having a $\frac{1}{2}''$ inner diameter, $\frac{3}{16}''$ axial length, and being formed of #38 SSE wire multi-layer wound, gears 38/39, and impregnated with Cerese AA.

The variations in the apparent capacitance of an inductance unit of the type described may be additionally reduced by providing the inductance unit with a magnetic core, preferably of thinly laminated, powdered, or comminuted iron or ferrous alloy. The use of such a core increases the effective inductance and power factor of the unit, but has a number of advantages where these particular characteristics are not disadvantageous, among which may be mentioned the damping of the overtones and the smaller dimensions and reduced external field.

It is the practice, in connection with radio-frequency translating circuits adapted for operation over a wide band of frequencies, for example, the "long wave" and "short wave" bands, to provide a plurality of inductance units which, with a single tuning condenser, are proportioned individually to tune the circuit over the several ranges. The coil not in use is generally disconnected and/or short-circuited but usually has at least a slight coupling with the active coils. It often occurs that the operating frequency in one of the higher frequency bands corresponds to the frequency of one of the disturbing overtones of an inductance unit designed for operation in a lower frequency band. Such coupling may be due to the inductance of the connections between the coils or to other causes.

In such an installation, for example, a system of the type disclosed and claimed in a copending application of John Kelly Johnson, Serial No. 724,198 filed May 5, 1934, Patent No. 2,054,424, issued Sept. 15, 1936, and inductance unit constructed in accordance with the principles outlined above is particularly advantageous for the secondary winding system of the coupling transformer. One such inductance unit is shown in Fig. 7 of the drawings. In this figure the multiple winding inductance unit 30 comprises a divided symmetrical inductance unit consisting of sections 30a and 30b designed in accordance with the principles of the inductance unit of Fig. 1. These winding sections are disposed on an insulation form 31, upon which are also arranged a plurality of other coils or winding sections 32, 33, and 34, suitable for operation in higher frequency bands. The several windings are connected in series, as illustrated, and the end terminals of the inductance unit 30a, 30b and the winding 34 and the intermediate terminals of the other windings are connected to the several contacts 35 with which cooperates a switch member 36, constructed to short-circuit progressively and cumulatively the several windings, beginning with the lowest frequency inductance unit 30a, 30b. Tuning condenser 37 is connected across the complete inductance assembly, that is, between the outermost terminals of the windings 30a and 34. A conductive shielding receptacle 38 surrounds the inductance assembly and an auxiliary disc 39 is preferably interposed between the winding section 30a and the end of the shield 38. This shield is effective to minimize capacitive currents from the central portion of the winding section 30a to the shield 38 and thence to ground.

The principles of operation of the inductance unit assembly of Fig. 7 are in all respects similar to those discussed in connection with Fig. 1, above. By proportioning the inductance unit 30a, 30b in accordance with my invention, the appearance of "dead spots" in the higher frequency ranges of operation of the tuning unit, due to the damping of one or more of such high frequencies by parasitic currents in inductance unit 30a, 30b, is substantially eliminated. Furthermore, the inductance unit 30a, 30b is preferably so proportioned that disturbing overtones which it is difficult to eliminate, such as the third overtone, fall outside of the operating ranges of the several inductance elements or within and at or near that limit of one of the ranges for which the capacitance of the tuning condenser 37 is minimum.

The multiple frequency-range inductance assembly of Fig. 8 is in all respects similar to that of Fig. 7, with the exception that the design of the lowest frequency inductance unit is in accordance with the principles discussed in connection with Fig. 3, above, that is, of an unsymmetrical inductance unit. The several elements in Fig. 8 are referred to by reference characters having the same final digits as the reference characters applied to corresponding elements in Fig. 7.

While I have described what I at present consider the preferred embodiments of my invention, it will be obvious to those skilled in the art that various changes and modifications may be made therein without departing from my invention, and I, therefore, aim in the appended claims to cover all such changes and modifications as fall within the true spirit and scope of my invention.

What is claimed is:

1. A radio-frequency self-inductance unit comprising two serially connected coaxial concentrated winding sections, each section having an inner and outer terminal and said sections being interconnected through said inner terminals, each of said sections having non-uniform distributed reactance and the spacing of said sections being determined to provide a distributed capacitance between sections effective substantially to compensate for the non-uniformity of distributed reactance of each section.

2. A radio-frequency self-inductance unit comprising two serially connected coaxial concentrated winding sections, each section having an inner and outer terminal and said sections being interconnected through said inner terminals, each of said sections having a distributed capacitance and inductance which varies over the extent thereof and the spacing of said sections being determined to provide a distributed capacitance between sections varying over the extent thereof substantially complementary to the variation of the distributed reactance of each section.

3. A radio-frequency self-inductance unit comprising two serially connected coaxial multi-layer winding sections, each section having an inner and outer terminal and said sections being interconnected through said inner terminals, each of said sections having a non-uniform distributed capacitance and inductance and the spacing of said sections being determined to provide a distributed capacitance between sections effective substantially to compensate for the non-uniformity of distributed capacitance and inductance of each section.

4. A radio-frequency self-inductance unit comprising two serially connected coaxial concentrated winding sections, each section having an inner and outer terminal and said sections being interconnected through said inner terminals, said sections being wound so that their mutual inductance adds to the self-inductance of the unit, each of said sections having non-uniform distributed reactance and the spacing of said sections being determined to provide a distributed capacitance between sections effective substantially to compensate for the non-uniformity of distributed reactance of each section.

5. A symmetrical radio-frequency self-inductance unit comprising two substantially identical serially connected coaxial concentrated winding sections, each section having an inner and outer terminal and said sections being interconnected through said inner terminals, each of said sections having non-uniform distributed reactance and the spacing of said sections being determined to provide a distributed capacitance between sections effective substantially to compensate for the non-uniformity of distributed reactance of each section.

6. An unsymmetrical radio-frequency self-inductance unit comprising two serially connected concentrated winding sections, said sections being adapted to be unsymmetrically disposed relative to a conductive body of relatively fixed reference potential, a terminal of said unit constituting a terminal of one of said sections and being adapted to be connected to said conductive body, that section adapted to be connected to said body having a lesser inductance than the other of said sections.

7. An unsymmetrical radio-frequency self-inductance unit comprising two serially connected concentrated winding sections, a conductive shield for said unit, said sections being unsymmetrically disposed relative to said shield, and a terminal of said unit constituting a terminal of one of said sections and being connected to said shield, that section connected to said shield having a fewer number of turns than the other of said sections.

8. An unsymmetrical radio-frequency self-inductance unit comprising two serially connected concentrated winding sections; a conductive shield for said unit, said sections being unsymmetrically disposed relative to said shield, an outer terminal of said section having the greater distributed capacitance to said shield being connected thereto, the inner terminals of said sections being interconnected, and the last-named section having an inductance less than the other section.

9. An unsymmetrical radio-frequency self-inductance unit comprising two serially connected concentrated winding sections, each section having an inner and outer terminal and said sections being interconnected through said inner terminals, each of said sections having non-uniform distributed reactance and the spacing of said sections being determined to provide a distributed capacitance between sections effective substantially to compensate for the non-uniformity of distributed reactance of each section, said sections being adapted to be unsymmetrically disposed relative to a conductive body of relatively fixed reference potential, a terminal of said unit constituting a terminal of one of said sections and being adapted to be connected to said conductive body, that section adapted to be connected to said body having a lesser inductance than the other of said sections.

10. An unsymmetrical radio-frequency self-inductance unit comprising two serially connected coaxial multi-layer winding sections, each section having an inner and outer terminal and said sections being interconnected through said inner terminals, each of said sections having a non-uniform distributed capacitance and inductance and the spacing of said sections being determined to provide a distributed capacitance between sections effective substantially to compensate for the non-uniformity of distributed capacitance and inductance of each section, and a conductive shield surrounding said unit, said sections being unsymmetrically disposed relative to said shield, the outer terminal of the section having the greater capacitance to said shield being connected thereto, and said last-named section having an inductance less than the other section.

11. A multiple frequency-range self-inductance unit comprising a first inductance element comprising two similar serially connected coaxial multi-layer winding sections, each section having an inner and outer terminal and said sections being interconnected through said inner terminals, each of said sections having a non-uniform distributed capacitance and inductance and the spacing of said sections being determined to provide a distributed capacitance between sections effective substantially to compensate for the non-uniformity of distributed capacitance and inductance of each section, a plurality of other inductive elements comprising distributed windings of lower inductance disposed coaxially with said first element and spaced therefrom, a conductive shielding receptacle disposed around said unit, and an auxiliary shielding disc interposed between said first inductance element and said receptacle and connected directly to the outer terminal of the adjacent section of said element.

12. A multiple frequency-range self-inductance unit comprising a first unsymmetrical inductance element comprising two serially connected concentrated winding sections, a conductive shielding receptacle surrounding said unit, said sections being unsymmetrically disposed relative to said receptacle, an auxiliary shield disc interposed between said receptacle and that winding section having the greater distributed capacitance thereto, the outer terminal of said latter section being connected to said disc and the inner terminals of said sections being interconnected, said latter section having an inductance less than the other section, and a plurality of other inductive elements comprising distributed windings of lower inductance disposed coaxially with said first element and spaced therefrom.

13. A radio-frequency tuning unit adapted for connection in circuit with a tuning condenser and comprising a self-inductance unit having two serially connected coaxial concentrated winding sections, each section having an inner and outer terminal and said sections being interconnected through said inner terminals, each of said sections having non-uniform distributed inductance and capacitance and the spacing of said sections being determined to provide a distributed capacitance between sections effective substantially to compensate for the non-uniformity of distributed inductance and capacitance of each section, the dimensions of said inductance unit being such that the third over-tone frequency thereof lies outside the major portion of the tuning range of the unit.

14. A radio-frequency tuning unit adapted for connection in circuit with a tuning condenser and comprising a self-inductance unit having two serially connected coaxial concentrated winding sections, each section having an inner and outer terminal and said sections being interconnected through said inner terminals, each of said sections having non-uniform distributed inductance and capacitance and the spacing of said sections being determined to provide a distributed capacitance between sections effective substantially to compensate for the non-uniformity of distributed inductance and capacitance of each section, the dimensions of said inductance unit being such that the third overtone frequency thereof lies within and near that limit of the tuning range of the tuning unit in which the capacitance of said tuning condenser is of the order of its maximum value.

15. A multiple frequency-range tuning unit comprising a self-inductance element comprising two serially connected coaxial concentrated winding sections, each of said sections having non-uniform distributed inductance and capacitance and the spacing of said sections being determined to provide a distributed capacitance between sections effective substantially to compensate for the non-uniformity of distributed inductance and capacitance of each section, one or more other inductance elements of lower inductance assembled with said first element, a tuning condenser, and means for effectively connecting said condenser in circuit with a selected inductance element or elements, the dimensions of said first-named inductance element being such that the third overtone frequency thereof falls outside of one of the tuning ranges of said unit and within and near that limit of another tuning range corresponding to a minimum value of the capacitance of said tuning condenser.

16. A multiple frequency-range tuning unit comprising a self-inductance element comprising two serially connected coaxial concentrated winding sections, each of said sections having non-uniform distributed inductance and capacitance and the spacing of said sections being determined to provide a distributed capacitance between sections effective substantially to compensate for the non-uniformity of distributed inductance and capacitance of each section, one or more other inductance elements of lower inductance assembled with said first element, a tuning condenser, switch means for effectively connecting said condenser in circuit with a selected inductance element or elements and for simultaneously short-circuiting that element or elements not connected in circuit with said condenser, the dimensions of said first-named inductance element being such that the third overtone frequency thereof falls outside of one of the tuning ranges of said unit and within and near that limit of another tuning range corresponding to a minimum value of the capacitance of said tuning condenser.

17. A radio-frequency self-inductance unit comprising two coaxial concentrated winding sections of substantial radial depth, said sections being connected in series at their turns of least radius and being wound in opposite directions so that their mutual inductance increases the total inductance of the unit, and the spacing of said sections being determined substantially to reduce the excess conductance of the unit at the second overtone frequency.

18. A radio-frequency self-inductance unit comprising two substantially identical coaxial concentrated winding sections of substantial radial depth, said sections being connected in series at their turns of least radius and being wound in opposite directions so that their mutual inductance increases the total inductance of the unit, and said sections being disposed symmetrically with respect to a plane normal to their common axis and being separated by a distance less than their maximum radius, whereby excess conductance of the unit at the first overtone frequency is substantially eliminated.

19. A radio-frequency self-inductance unit comprising two coaxial multi-layer winding sections connected in series, a nearby conductive shield, said sections being connected at one uncommon terminal to said shield, and said sections being wound of similar wire in a similar manner but having unequal numbers of turns adjusted substantially to eliminate excess conductance at the first overtone frequency.

20. A radio-frequency self-inductance unit in which there is a tendency toward irregularities in apparent capacitance of the unit at frequencies near its first overtone frequency, comprising at least two concentrated winding sections connected in series, and a nearby conductive body effectively connected to an uncommon terminal of said sections, said sections being unsymmetrically disposed relative to said conductive body having their relative numbers of turns adjusted with reference to the inherent capacitance between said sections and that between said sections and said conductive body, substantially to minimize said irregularities.

21. A radio-frequency self-inductance unit in which there is a tendency toward irregularities in apparent capacitance of the unit at frequencies near its first overtone frequency, comprising two coaxial multi-layer winding sections connected in series and a shield at least partially enclosing said sections and effectively connected to one uncommon terminal thereof, said sections having their relative numbers of turns adjusted with reference to the inherent capacitance between said sections and that between said sections and said shield, substantially to minimize said irregularities.

22. A radio-frequency self-inductance unit in which there is a tendency toward irregularities in apparent capacitance of the unit at frequencies near its second overtone frequency, comprising two coaxial multi-layer winding sections, said sections being serially connected at their inner turns, being wound in opposite directions so that mutual inductance therebetween aids the self-inductance thereof, and being situated in proximity to each other so that there is substantial inductive and capacitive coupling therebetween, the spacing therebetween being proportioned substantially to minimize said irregularities.

23. A radio-frequency self-inductance unit in which there is a tendency toward irregularities in the apparent capacitance of the unit at frequencies near its first overtone frequency comprising two similar coaxial multi-layer winding sections, said sections being wound in opposite directons, being so situated in proximity to each other that there is substantial inductive and capacitive coupling therebetween, and being serially connected at their inner turns so that mutual inductance therebetween aids the self-inductance thereof, whereby said irregularities are minimized.

24. A radio-frequency self-inductance unit in which there is a tendency toward irregularities in the apparent capacitance of the unit at frequencies near its first overtone frequency comprising two coaxial multi-layer winding sections, a conductive body in proximity to said sections and electrically unsymmetrically disposed relative to one of said sections, said sections being serially connected at their inner turns, being situated in proximity to each other so that there is substantial inductive and capacitive coupling therebetween, and being wound in opposite directions so that mutual inductance therebetween aids the self-inductance thereof, said one section having a fewer number of turns than said other section and so related thereto as to minimize said irregularities at the first overtone frequency.

HAROLD A. WHEELER.